United States Patent [19]

Taylor

[11] 4,058,722

[45] Nov. 15, 1977

[54] ELECTRO-OPTIC ANALOG/DIGITAL CONVERTER

[75] Inventor: Henry F. Taylor, San Diego, Calif.

[73] Assignee: The United States of America as represented by the Secretary of the Navy, Washington, D.C.

[21] Appl. No.: 727,744

[22] Filed: Sept. 29, 1976

[51] Int. Cl.² ............................................. G02F 7/00
[52] U.S. Cl. ............................ 250/225; 340/347 AD
[58] Field of Search .................. 250/225; 340/347 AD

[56] References Cited

U.S. PATENT DOCUMENTS 3,641,564  2/1972  Fassett et al. ................. 340/347 AD

*Primary Examiner*—James B. Mullins
*Attorney, Agent, or Firm*—R. S. Sciascia; G. J. Rubens; J. W. McLaren

[57] ABSTRACT

A plurality of identical dielectric channel optical wave guides is fabricated in a single crystal substrate of linear electro-optic material and a source of linearly polarized light is arranged to transmit its light energy along each of the optical waveguides. Electrodes are disposed contiguous to the optical waveguides for impressing electric fields thereacross. An input signal potential is applied to the electrodes to produce electric fields of intensity relative to each of the waveguides such that causes phase shift and resultant change of polarization which can be detected as representative of a binary "one" or binary "zero" for each of the channel optical waveguides. The resultant binary output is the multiple bit analog-to-digital conversion of the analog potential having amplitude V impressed upon the converter.

7 Claims, 6 Drawing Figures

ELECTRO-OPTIC ANALOG/DIGITAL CONVERTER

BACKGROUND OF THE INVENTION

Analog-to-digital converters of the type described by D. F. Hoeschele Jr. in the text entitled ANALOG-TO-DIGITAL/DIGITAL-TO-ANALOG CONVERSION TECHNIQUES, published by Wiley in 1968, are widely used in present day technology to translate sensor measurements of an analog nature into the digital language of computing and data processing for use in information and control systems. In some of these systems, such as the signal processors for wideband radars, for example, performance is inherently limited by the maximum attainable speed of operation of present state of the art wholly electronic analog-to-digital converters.

More recently, the use of electro-optic grating type of light beam deflector for analog-to-digital conversion was reported by S. Wright, I. M. Mason, and M. G. F. Wilson in an article entitled HIGH-SPEED ELECTRO-OPTIC ANALOGUE-DIGITAL CONVERSION, published in *Electronics Letters*, Vol. 10, pp. 508–509 on Nov. 28, 1974. The grating light beam deflector type of device offers the desirable potential of high speed operation but unfortunately is inherently limited to a maximum precision of only three bits of binary representation.

Accordingly, it is highly desirable that the advantages of the potential high speed capabilities of an electro-optic analog-to-digital converter be realized without inherent limitation as to the number of binary bits of information which can be processed by such a converter.

SUMMARY OF THE INVENTION

The electro-optic analog-to-digital converter of the present invention contemplates the use of multiple optical intensity modulators having outputs exhibiting operative characteristics based on a linear electro-optic phase retardation varying in periodic fashion as a function of an applied electric field which, in turn, is derived from the analog input potential that it is desired to convert to digital form. The concept of the present invention employs the variations of linear electro-optic phase retardation in a periodic manner and its similarity to the fact that each bit in the binary representation of an analog quantity is also a periodic function of the value of that quantity.

In accordance with the concept of the present invention, an array of multiple identical dielectric channel optical waveguides is fabricated in a single crystal substrate of a linear electro-optic material. Each optical waveguide, which can support one predominately TE and one predominately TM guided mode of light propagation, is excited by linearly polarized light from a suitable source such as a CW laser. An electric potential creates an electric field across each waveguide and the electro-optic interaction causes an amount of phase retardation of transmission of the light energy along each of the optical waveguides. The polarization of the light energy which is thus acted upon in an electro-optic fashion is detected and a binary representation from each of the optical waveguides is obtained by electronically comparing the intensities of the two orthogonally polarized light components, generating a binary "one" or a binary "zero" as determined by the results of the comparison.

More specifically, the present invention contemplates an electro-optic analog-to-digital converter for digitizing an analog electrical potential of amplitude V. A plurality of identical dielectric channel optical waveguides is fabricated in a single crystal substrate of linear electro-optical material such as lithium tantalate or lithium niobate, for example.

A source of linearly polarized light, which may be generated by a CW laser, is arranged and adapted to transmit its output light energy along each of the waveguides. A plurality of electrodes are disposed contiguous to the optical waveguides for impressing electric fields thereacross upon the application of electrical potentials to the respective electrodes. The analog electrical potential having amplitude V which it is desired to digitize is received by a means which applies an electrical potential to each of the electrodes such that the product of the potential applied to the n th electrode of length $L_n$ is $$V_n L_n = V L_1 \times 2^{n-1}$$

where $n = 1, 2, 3, \ldots$

The light transmitted along each optical waveguide is accordingly acted upon to cause phase retardation and consequent resultant change of polarazation in accordance with the intensity of the interacting electric field impressed across each of the optical waveguides. A means is provided which is responsive to the light in each of the optical waveguides for producing output light signals indicative of a predetermined condition of polarization.

Further detection is arranged to respond to the output light signals from each of the respective optical waveguides for producing commensurate electrical signals. After suitable amplification, the pair of electrical signals derived from each optical waveguide are impressed upon an associated analog comparator which compares the electrical signals derived from the emergent light of each optical waveguide and is responsive to such electrical signals for producing a binary output representative of the relative amplitudes of its received signals. The several binary outputs in the form of either a binary "one" or a binary "zero" derived from a plurality of optical waveguides are combined to cumulatively provide the multiple bit, digitized representation of the analog value of the electrical potential V received by the converter.

Accordingly, the concept of the present invention provides an electro-optic analog-to-digital converter which avails of the extremely high speed operation provided by electro-optic phenomena.

Moreover, the electro-optic analog-to-digital converter of the present invention is considerably less complex and costly than wholly electronic devices providing comparable functional operation, though not capable of attaining the speed of operation of the present invention. Many wholly electronic devices which are functionally comparable to the present invention have attained the maximum realizeable speed of operation, while the present invention not only achieves significantly higher speed of operation employing present day state of the art electro-optic capabilities but affords the potential of much higher speed of operation such as may result from future advances in the electro-optic arts.

Accordingly, it is a primary object of the present invention to provide an improved analog-to-digital converter which avails of the significantly higher speed of operation attainable through the use of electro-optic phenomena.

It is an equally important object of the present invention to provide an electro-optic analog-to-digital converter which in addition to affording higher speed operation is less costly and less complex than functionally comparable wholly electronic devices.

A further important object of the present invention is to provide such an improved electro-optic analog-to-digital converter which obviates inherent limitations of present day known electro-optic analog-to-digital converters.

Another object of the present invention is to provide an electro-optic analog-to-digital converter which is not inherently limited as to the number of digitized bits of information it can provide for maximum precision.

These and other features, objects, and advantages of the present invention will be better appreciated from an understanding of the operative principles of a preferred embodiment as described hereinafter and as illustrated in the accompanying drawings.

DESCRIPTION OF THE PREFERRED EMBODIMENTS

Figure 1:
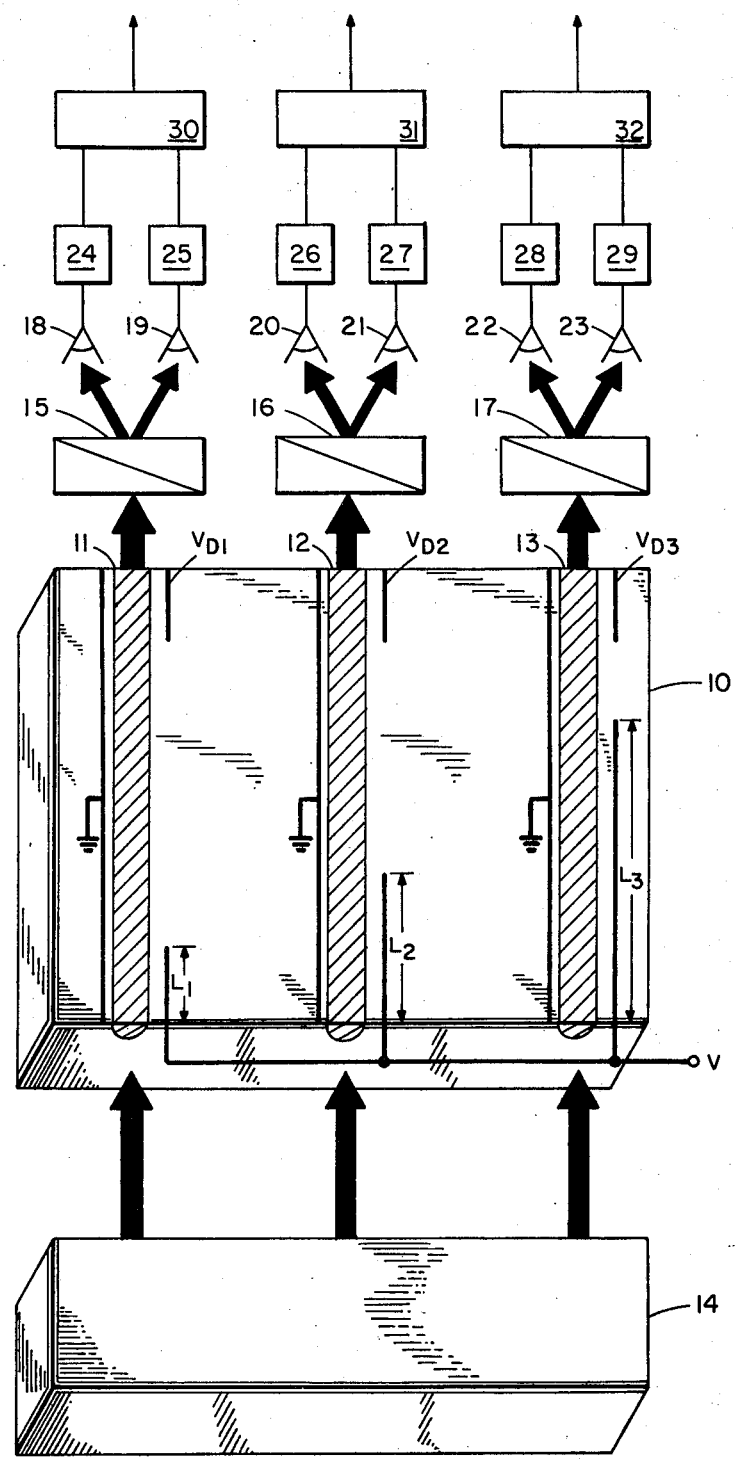
FIG. 1 is a schematic representation of one embodiment of the present invention.

In accordance with the concept of the present invention as illustrated in FIG. 1, a single substrate of linear electro-optic material 10 supports a plurality of identical dielectric channel waveguides 11, 12 and 13. The linear electro-optic material of the so-called "Pockels" type may comprise lithium tantalate or lithium niobate, for example, and the multiple identical channel waveguides may be fabricated in the substrate by the deposition or diffusion of a suitable material so as to provide channels of significantly higher index of refraction which will support the propagation of light energy therealong by total internal reflection.

Each of the waveguides 11, 12 and 13 thus can support one predominately TE and one predominately TM guided mode of light propagation of light energy generated by a suitable source 14 which may comprise a CW laser arranged and adapted to transmit its output light energy along each of the waveguides.

A plurality of electrodes designated $L_1$, $L_2$, and $L_3$ are disposed contiguous to respective optical waveguides for impressing electric fields thereacross upon the application of an electrical potential. A connection is arranged to receive the analog electrical potential V which it is desired to digitize, and in the embodiment illustrated in FIG. 1, the electrical potential V is applied to each of the electrodes designated $L_1$, $L_2$, and $L_3$. The intensity of the electric field and area of electro-optic interaction created by such application of the electrical potential V is such that the product of the potential applied to the n th electrode of length $L_n$ is $$V_n L_n = V L_1 \times 2^{n-1} \tag{1}$$

where $n = 1, 2, 3, \ldots$

Since the received analog potential V is applied to each of the three electrodes $L_1$, $L_2$, and $L_3$, the electro-optic interaction length $L_n$ for the n th optical waveguide may be determined by the length of each of the electrodes which is defined by $$L_n = 2^{n-1} L_1,$$
$$n = 1, 2, 3, \ldots \tag{2}$$

In accordance with the resultant electro-optic interaction and phenomena, the phase of light in the TE mode is retarded with respect to the phase of light in the TM mode by an amount $\Delta\Gamma_n$ which may be expressed in the terms:

$$\Delta\Gamma_n = 2^{n-1} K L_1 V. \tag{3}$$

The value of the constant K may be determined by the electro-optic coefficients of the particular material employed, the parameters of the optical waveguides, and the electrode spacing.

The light energy emerging from the waveguides 11, 12 and 13 is received by polarization separators 15, 16, and 17, respectively, each of which may comprise a Rochon or Wollaston type of prism, for example.

The polarization separators 15, 16, and 17 perform the function of discretely detecting the intensities of two orthogonally polarized components of light energy which may be designated as "a" and "b". The intensities of these respective light energy components of differently polarized energy may be expressed as $$I_{na} = A_n \cos^2(\Delta\Gamma_n/2 + \psi_n) + B_n \tag{4}$$

$$I_{nb} = A_n \sin^2(\Delta\Gamma_n/2 + \psi_n) + C_n \tag{5}$$

where $\psi_n$ is a static phase shift, $A_n$ is the modulation amplitude and $B_n$ and $C_n$ are dc terms which can be removed from the detector signals by filtering or subtraction.

It is, of course, desirable that the modulation amplitude be maximized and this may be accomplished by independently adjusting the orientation of the polarization separator and of the polarization vector of the incident beam of light energy. Each of the polarization separators 15, 16, and 17 produces two outputs which are indicative of a predetermined condition of polarization and these output signals are detected by photodetection means 18, 19, 20, 21, 22, and 23.

The photodetectors 18 through 23 convert the intensity of light energy received by each to a commensurate electrical signal and the resultant electrical signals may be amplified in suitable electronic amplification means 24–29. The electrical signals produced by the amplifiers 24–29, which are representative of the amplitude of orthogonally polarized light energy components developed in the plurality of optical waveguides, are connected in pairs to analog comparators 30, 31 and 32. The electrical signals developed from the emergent light of each optical waveguide are paired and connected to a separate analog comparator which performs the function of producing a binary output representative of the relative amplitudes of its received signals.

Thus, by electronically comparing the intensities $I_{na}$ and $I_{nb}$ and generating a "one" or "zero" for the $n$ th bit, based on the outcome of such comparisons, a multiple bit binary output is obtained which is the digitized representation of the amplitude of the analog potential V received as an input by the converter for purposes of transforming to a digital output form.

Figure 2A:
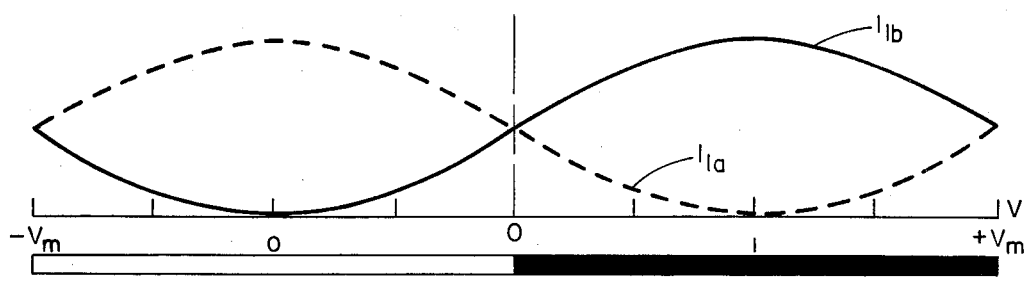
FIGS. 2a, 2b and 2c are graphical illustrations of the operative outputs of first, second, and third optical waveguides, respectively, of an embodiment of the present invention as is illustrated in FIG. 1.
Figure 2B:
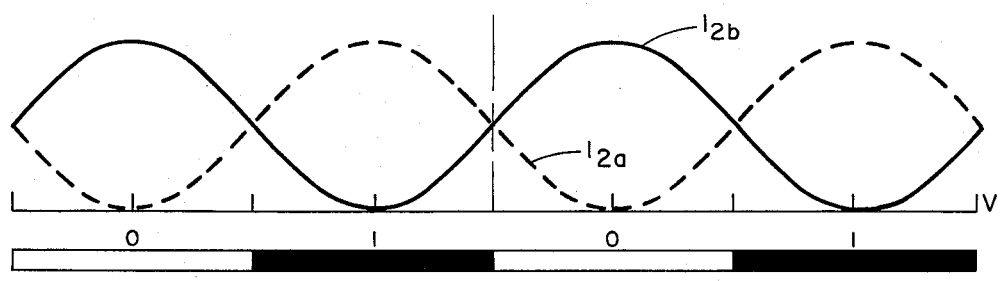
Figure 2C:
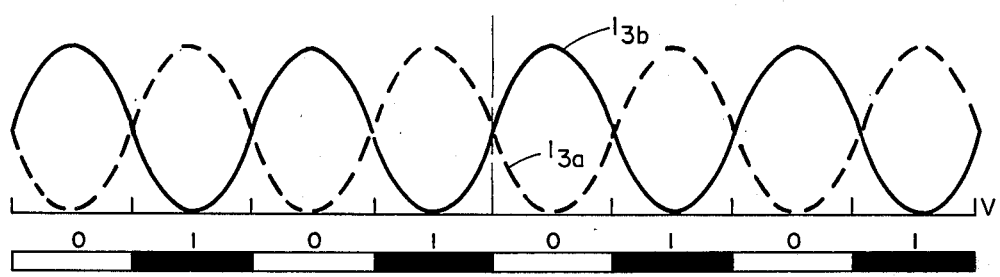

For example, an offset binary code for a bipolar signal is obtained if $\psi_n = \pi/4$ each $n$ by generating a "one" for the first bit if $I_{lb} > 1_{la}$ and a "one" for the $n$ th bit, $n = 2, 3, \ldots$ if $I_{na} > I_{nb}$. The required values for the $\psi$'s are obtained by applying a dc voltage $V_{Dn}$ to a short section of each waveguide. In FIG. 1 the $V_{Dn}$ values are represented by $V_{D1}$, $V_{D2}$, and $V_{D3}$ applied to the short separate electrodes. The intensities $I_{na}$ and $I_{nb}$ of each of the three optical channels of the embodiment of FIG. 1 and the corresponding offset binary code are plotted as a function of V in FIGS. 2a, 2b, and 2c, respectively, for a device with 3-bit precision, with the binary "one" and binary "zero" indicated for each channel immediately below each respective curve.

The number of bits of precision, N, which may be realized is related to the length "$l$" of the waveguides as expressed by $$N = \log_2(l/l_\pi) + 1 \quad (6)$$

where $l_\pi$ is the minimum length required for pi-radian electro-optic phase retardation.

The expression $$l_\pi = V_\pi d/V_m \quad (7)$$

relates $l$ to the electrode spacing $d$, the half wave voltage of the material $V_\pi$, and the maximum applied voltage $V_m$, where it is assumed that V varies between $\pm V_m$.

Accordingly, a numerical example may readily be developed for an embodiment of the present invention employing electro-optical material in the form of lithium tantalate, $LiTaO_3$, oriented with the c axis in the device plane and perpendicular to the optical waveguide axes of FIG. 1. The value of $V_\pi$ in lithium tantalate is 2700 V at 6328A for an applied electric field parallel to the c axis and with light propagation perpendicular to that axis.

If $V_m = 25$ V, and D = 5$\mu$m, corresponding to an average electric field strength of 50,000 V/cm between the respective electrodes, the value for $l_\pi$ is approximately 0.54mm as may be ascertained from equation (7). Calculating from equation (6) therefore the length of a 6-bit analog-to-digital converter embodying the present invention within the foregoing parameters is approximately 1.7cm.

Figure 3:
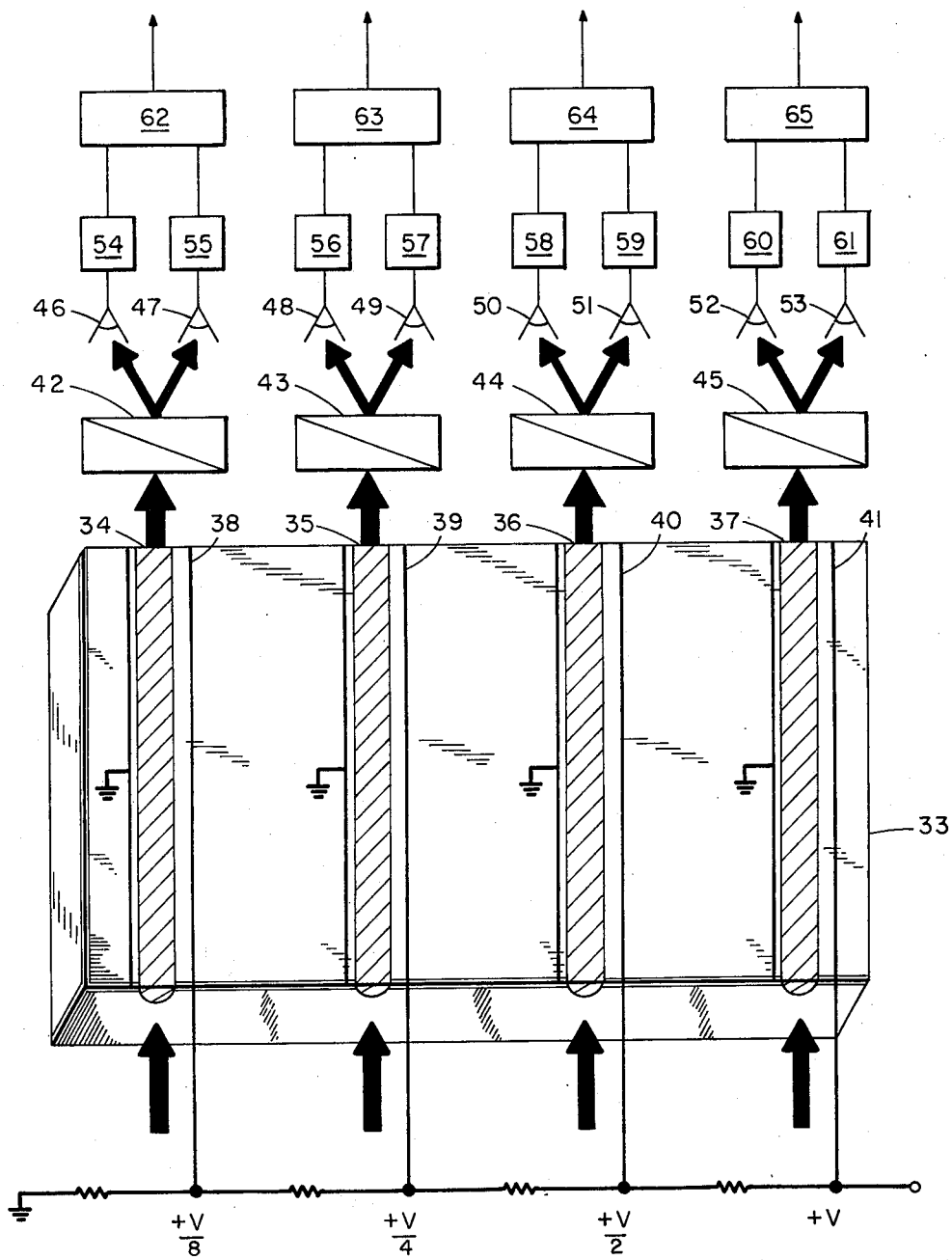
FIG. 3 is a schematic illustration of an alternate embodiment of the present invention.

An alternative embodiment of the present invention providing 4-bit binary digital output is illustrated in FIG. 3. A suitable single crystal substrate 33 of linear electro-optic material, such as lithium tantalate or lithium niobate, for example, supports four identical dielectric channel optical waveguides 34, 35, 36 and 37.

A plurality of electrodes 38, 39, 40 and 41 are disposed contiguous to respective optical waveguides for impressing electric fields thereacross upon the application of an electrical potential. It will be noted, however, that the electrodes are of the same length, rather than being of different lengths as was the case of the embodiment of the present invention illustrated in FIG. 1.

The analog electrical potential V, which it is desired to digitize, is received by the digital-to-analog converter of the present invention illustrated in FIG. 3 and divided down before being applied to the respective electrodes 38, 39, 40 and 41. The electrode 38 receives one-eighth of the potential V, electrode 39 receives one-fourth the potential V, electrode 40 receives one-half the potential of V, while electrode 41 receives the full amplitude of the potential V which it is desired to digitize in binary form.

Thus, the embodiment illustrated in FIG. 3 employs a different means for satisfying the requirement of the present invention that the electrical potential applied to each of the electrodes be such that the product of the potential and the length for each optical waveguide is $$V_n L_n = VL_1 \times 2^{n-1}$$

where $n = 1, 2, 3, \ldots$
where $L_n$ is the length of the $n$ th electrode and $V_n$ is the potential applied to the $n$ th electrode.

In a manner closely analogous to the previously described operation of the embodiment illustrated in FIG. 1, the configuration of the present invention as illustrated in FIG. 3 transmits polarized light energy to polarization separators 42, 43, 44 and 45, each of which separates polarization components which are separately detected by suitable photodetectors 46 through 53, each performing the function of producing an electrical output commensurate with the intensity of the polarization component of light energy received.

The electrical signals thus generated are appropriately amplified in amplifiers 54–61 and pairs of signals representative of the emergent light of two orthogonally disposed polarizations emergent from each of the waveguides are impressed, respectively, upon analog comparators 62–65. Each of the comparators 62–65 produces a binary output in the form of a "one" or a "zero" in a manner closely similar to that described previously in the explanation of the embodiment of FIG. 1.

In actual operation, the embodiment of FIG. 3 produces a 4-bit binary digitized output in response to analog input signals which may vary between sixteen incremental levels volts as indicated in Table I.

In Table I, the electro-optic interaction $VI_N/v_\pi l_\pi$ caused by potential V, where $v_\pi l_\pi = V_\pi d$ is listed for analog values $-8$ to $+8$ representative of $\pm V_m$; the binary digital outputs produced are listed by the four binary channels in the form of "one" and "zero".

TABLE I

| $\dfrac{V}{V_\pi}$ | Channels | | | |
|---|---|---|---|---|
| | 1 | 2 | 3 | 4 |
| −8 to −7 | 0 | 0 | 0 | 0 |
| −7 to −6 | 0 | 0 | 0 | 1 |
| −6 to 5 | 0 | 0 | 1 | 0 |
| −5 to −4 | 0 | 0 | 1 | 1 |
| −4 to 3 | 0 | 1 | 0 | 0 |
| −3 to 2 | 0 | 1 | 0 | 1 |
| −2 to 1 | 0 | 1 | 1 | 0 |
| −1 to 0 | 0 | 1 | 1 | 1 |
| 0 to +1 | 1 | 0 | 0 | 0 |
| +1 to +2 | 1 | 0 | 0 | 1 |
| +2 to +3 | 1 | 0 | 1 | 0 |
| +3 to +4 | 1 | 0 | 1 | 1 |
| +4 to +5 | 1 | 1 | 0 | 0 |
| +5 to +6 | 1 | 1 | 0 | 1 |
| +6 to +7 | 1 | 1 | 1 | 0 |
| +7 to +8 | 1 | 1 | 1 | 1 |

One difficulty which may be encountered in the use of materials having large electro-optic coefficients, such as lithium tantalate, is that the static birefringence exhibited by such materials may be strongly dependent on temperature. Accordingly, if lithium tantalate were employed in the practice of the present invention, it may be necessary to adjust the dc bias of the voltages $V_{D1}$ $V_{D2}$ and $V_{D3}$ as applied to the respectively associated auxiliary bias electrodes of the embodiment of FIG. 1, for example, to compensate for ambient temperature variations of significant concern, as well as for heating of the waveguide material by the RF modulating field.

Figure 4:
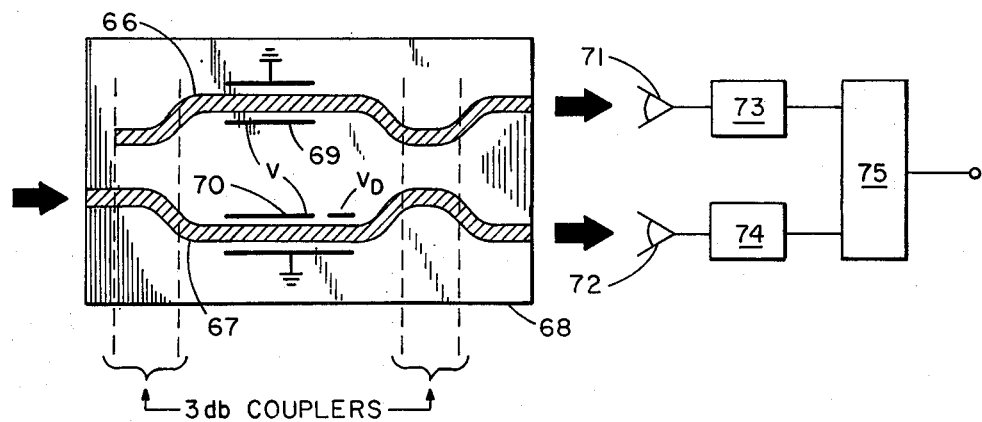
FIG. 4 is an illustration of another alternative which may be embodied in the present invention.

As an alternative to avoid the problem of temperature compensation encountered with materials such as lithium tantalate, each channel of the analog-to-digital converter of the present invention may employ a modulator structure of the type illustrated in FIG. 4. Polarized light, such as may be derived from a CW laser source, enters each channel modulator on the left as schematically represented by the heavy arrow.

The polarization of the incident CW laser beam is oriented for a maximum coupling into a particular mode (i.e., TE or TM) of one of a pair of substantially coextensive waveguides 66 and 67 which are supported on a suitable single crystal substrate of linear electro-optic material 68. The polarized CW light received by each of the type of channel modulator illustrated in FIG. 4 is split into equal amplitude components by a first 3 db directional coupler which functions in the manner of a 50% beam splitter.

As the two equal amplitude components of the light energy propagate along the waveguides 66 and 67, a phase shift equal in magnitude but opposite in size is induced in the respective waveguides 66 and 67 by a voltage V applied to the electrodes 69 and 70. The two spatial components are then mixed by a second 3 db coupler and the output from each of the waveguides 66 and 67 is detected separately by suitable photodetector means 71 and 72.

The dependence of the intensities of the two spatial components of light energy on the phase retardation $\Delta\Gamma_n$ is that expressed by equations (4) and (5), as is the case in all the embodiments of the present invention. In this case, the $\Delta\Gamma_n$ equals the difference in electro-optic phase shifts for the individual waveguides. The photodetected outputs in the form of electrical signals are suitably amplitude in amplifiers 73 and 74 and a binary output is produced by an analog comparator 75 in the form of a binary "one" or a binary "zero" in accordance with the relative amplitudes of its received inputs.

In an embodiment of the present invention employing a plurality of electro-optic modulators of the type illustrated in FIG. 4, variations in temperature will affect the phase of the propagating wave by the same amount in each waveguide so that net phase retardation due to temperature changes and variations should be zero. Accordingly, an embodiment of the present invention employing electro-optic modulators of the type illustrated in FIG. 4 for each of the channels providing a discrete bit of binary information in accordance with the present invention is self-compensating for temperature changes.

Those skilled and knowledgeable in the pertinent arts will appreciate that optical waveguide modulators employing lithium tantalate material have been known to operate at frequencies in the 1GHz range and present state of the art photomultiplier and avalanche photodiode detectors also are responsive in that same frequency range.

By contrast, the fastest wholly electronic analog-to-digital converters with six to eight bit precision have a maximum through-put rate in 100–200 megaword/second range and the complexity, as well as cost, of wholly electronic devices of this type increases considerably for conversion rates above 25 megawords/s.

Moreover, the electro-optic analog-to-digital converter of the present invention requires a relatively small number of elements such as detectors, comparators, etc. and that number only increases in direct proportion to the number of bits N. By contrast, the number of elements in a parallel converter using conventional wholly electronic technology is relatively large and furthermore increases as a function of $2^N$. Accordingly, it is clear beyond question that the electro-optic analog-to-digital converter of the present invention, in addition to its extremely high speed of operation producing higher conversion rate, is also inherently less complex than its functionally comparable wholly electronic counterparts.

Obviously many modifications and variations of the present invention are possible in the light of the above teachings. It is therefore to be understood that within the scope of the appended claims the invention may be practiced otherwise than as specifically described.

What is claimed is:

1. An electro-optic analog-to-digital converter for digitizing an analog electrical potential V comprising:
    a plurality of identical dielectric channel optical waveguides fabricated in a single-crystal substrate of linear electro-optic material;
    a source of linearly polarized light adapted to transmit its output light energy along each of said waveguides;
    a plurality of electrodes disposed contiguous to said optical waveguides for impressing electric fields thereacross upon the application of electrical potentials;
    means for receiving said analog electrical potential V and applying an electrical potential to each of said electrodes such that the product of the potential applied to the $n^{th}$ electrode of length $L_n$ is $$V_n L_n = V L_1 \times 2^{n-1}$$

where $n = 1, 2, 3, \ldots$;
    a means responsive to light in each said waveguide for producing output light signals indicative of a predetermined condition of polarization;
    photodetection means responsive to said output light signals for producing commensurate electrical signals; and
    an analog comparator for receiving electrical signals derived from the emergent light of each said waveguide and responsive thereto for producing a binary output representative of the relative amplitudes of its received signals.

2. An electro-optical analog-to-digital converter as claimed in claim 1 wherein said electrodes are all of the same length and a different potential is applied to each said electrode.

3. An electro-optical analog-to-digital converter as claimed in claim 1 whereas the same potential is applied to said electrodes and each said electrode is a different length.

4. An electro-optical analog-to-digital converter as claimed in claim 1 wherein said means responsive to the light in each waveguide for producing output light signals indicative of a predetermined condition of polarization comprises a polarization separator.

5. An electro-optical analog-to-digital converter as claimed in claim 1 wherein said means responsive to the light in each waveguide for producing output light signals indicative of a predetermined condition of polarization comprises a directionally coupled electro-optic modulator.

6. An electro-optical analog-to-digital converter as claimed in claim 1 wherein said single crystal substrate of linear electro-optic material comprises lithium tantalate.

7. An electro-optical analog-to-digital converter as claimed in claim 1 wherein said single crystal substrate of linear electro-optic material comprises lithium niobate.

* * * * *